No. 772,123. PATENTED OCT. 11, 1904.
V. G. APPLE.
LEAD CONTAINING CELL FOR SECONDARY BATTERIES.
APPLICATION FILED JUNE 3, 1903.
NO MODEL.
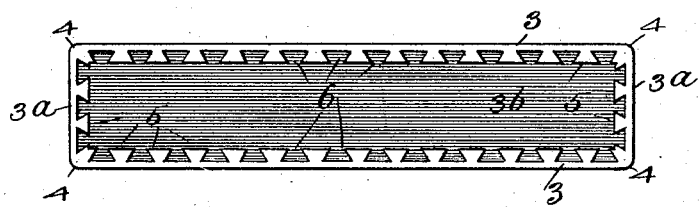
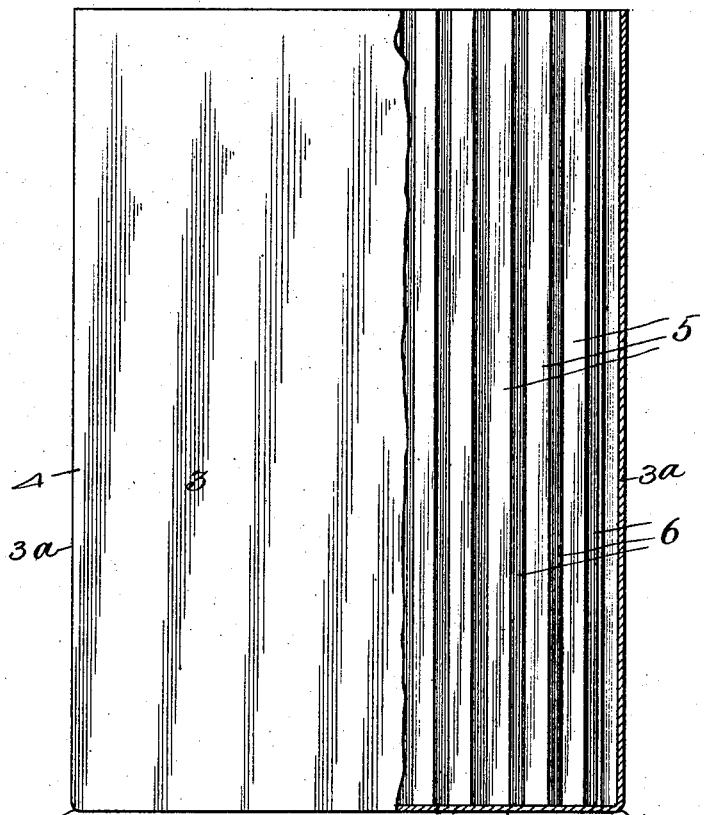
Witnesses
Ray White
Harry R. White
Inventor
Vincent G. Apple
By Toree Bain Atty.

No. 772,123. Patented October 11, 1904.

UNITED STATES PATENT OFFICE.

VINCENT G. APPLE, OF DAYTON, OHIO.

LEAD CONTAINING-CELL FOR SECONDARY BATTERIES.

SPECIFICATION forming part of Letters Patent No. 772,123, dated October 11, 1904.

Application filed June 3, 1903. Serial No. 159,838. (No model.)

*To all whom it may concern:*

Be it known that I, VINCENT G. APPLE, of Dayton, in the county of Montgomery and State of Ohio, have invented certain new and useful Improvements in Lead Containing-Cells for Secondary Batteries; and I hereby declare that the following is a full, clear, and exact description thereof, reference being had to the accompanying drawings, which form part of this specification.

My invention relates to improvements in lead containing-cells for secondary batteries, and has for its object the production of an article of manufacture comprising a lead containing-cell of the character described having peculiar characteristics of density, lightness, and configuration developed by its process of manufacture.

In the production of a containing-cell for a storage or secondary battery, particularly those designed for employment in conjunction with motor-vehicles or for analogous purposes requiring transportation, it is apparent that lightness and strength of the cell structure are of paramount importance. It is also obviously desirable that the interior surface of the cell be so formed that the cell may serve as one of the active elements of the completed battery, and if the cell is to be of the "pasted" type that projections be formed upon the interior surface of the cell so shaped as to afford the most efficient support to the active material to prevent the same from jarring loose and sluing off when the cell is transported from place to place. All these desiderata may be attained by the construction of cups in the manner and after the design hereinafter set forth.

In the drawings, Figure 1 is a top plan view illustrating a storage-battery cell constructed in accordance with my invention. Fig. 2 is a side elevation, partly in section, of the same.

Referring now to the drawings, 3 3 indicate side walls, $3^a$ $3^a$ end walls, and $3^b$ the bottom wall of a lead storage-battery cell, all formed in one integral piece without seam or joint. On its exterior surface every corner and edge formed by the meeting of angularly-disposed surfaces preferably is rounded, as illustrated at 4, to facilitate the handling of the cell for various purposes.

5 5 indicate ribs or projections vertically disposed in parallel arrangement and formed upon the interior of each of the sides 3 3 and ends $3^a$ $3^a$ of the cell integrally with the supporting-walls. These ribs 5 may of any suitable configuration and are designed to increase the superficial area of the interior surfaces of the cell in excess of the minimum area or that surface area presented by flat wall-faces, such as those constituting the exterior surface of the cell.

It will be apparent that if the cell is to be "formed" by electrodeposition, as by the Planté system, the increased surface area is advantageous, while when the battery is to be of the pasted type the projecting ribs 5 afford support to the active material. To the end last mentioned I prefer to give the ribs 5 5 a dovetailed shape, so as to leave therebetween grooves 6, likewise of dovetailed shape, presenting their reduced portions to the interior of the cell. These grooves, it will be seen, when filled with active material will serve to hold such material against displacement in a most efficient manner.

The form of integral cell which I have just described is made by first subjecting lead, preferably in a commercially-pure condition, to the action of heat sufficient to melt or soften it and then forcing the softened or molten lead under pressure into a mold, so that the lead forms an integral homogeneous structure of uniform and great density. The lead being thus swaged and uniformly condensed local action upon the active surfaces thereof is largely eliminated. In the practice of my invention I have found that it is possible to cast the lead in the softened condition assumed thereby just before reaching the fusing-point (approximately 620° Fahrenheit) by employing a sufficiently-great pressure; but, if preferred, the lead may be heated above the melting-point and cast in a molten condition. In practice I find that for small cells with the lead in a molten condition a pressure of one hundred and twenty pounds to the square inch produces excellent results; but the larger the cell to be cast and the thinner its walls are to be made the greater the pressure that must be employed.

By the process herein described I am enabled to produce cells of much less thickness and correspondingly less weight than by any other process of manufacture now known to me, as the forcing of the metal under pressure into the mold enables the cast wall to be made extremely thin, the density of the wall thus cast precluding the possibility of the formation of blow-holes and making an absolutely tight cell. In practice I am now making in the manner herein described lead cells of the type specified, the thickness of whose walls does not exceed one thirty-second ($\frac{1}{32}$) of an inch.

Having thus described my invention, what I claim, and desire to secure by Letters Patent of the United States, is—

1. As an article of manufacture, a lead containing-cell for secondary batteries whereof the containing-wall structure is thinner and denser than ordinary cast walls, formed in a single piece without seam or joint, of lead, cast under pressure while in a softened or molten condition.

2. As an article of manufacture, a containing-cell for secondary batteries having an interior surface of relatively large superficial area, whereof the walls and bottom are thinner and denser than ordinary cast walls, and formed in a single piece without seam or joint, of lead, cast under pressure while in a softened or molten condition.

3. As an article of manufacture, a containing-cell for secondary batteries having side and end walls ribbed on their interior surfaces, and a bottom and thinner and denser than ordinary cast walls, all formed in a single piece of lead cast under pressure while in a softened or molten condition.

4. As an article of manufacture, a containing-cell for secondary batteries comprising a bottom and a containing-wall structure provided with vertically-disposed dovetailed ribs.

5. As an article of manufacture, a cast-lead containing-cell for secondary batteries having side and end walls provided with vertically-disposed dovetailed ribs, and a bottom, all formed in one integral piece.

6. As an article of manufacture, a cast-lead containing-cell for secondary batteries having straight sides, ends and bottom walls, rounded at their adjoining edges, the side and end walls having vertically-disposed dovetailed ribs thereon, all formed in a single piece of lead cast under pressure while in a softened or molten condition.

In testimony that I claim the foregoing as my own I affix my signature in presence of two witnesses.

VINCENT G. APPLE.

In presence of—
   Geo. T. May, Jr.,
   Mary F. Allen.